United States Patent [19]

Marechal et al.

[11] 3,923,985

[45] Dec. 2, 1975

[54] PROCESS FOR THE PREPARATION OF 16α-METHYL-Δ$^{1,4,9(11)}$-PREGNATRIEN-3,20-DIONES AND USE OF THE SAME IN TREATMENT OF ALLERGIES

[75] Inventors: Jacques Prost Marechal, Paris; Georges Tomasik, Rosny-sous-Bois, both of France

[73] Assignee: Roussel-UCLAF, Paris, France

[22] Filed: July 24, 1974

[21] Appl. No.: 491,339

[30] Foreign Application Priority Data

July 27, 1973 France .............................. 73.27578

[52] U.S. Cl............................. 424/243; 260/397.45
[51] Int. Cl.$^2$......................................... A61K 31/56
[58] Field of Search............... 260/397.45; 424/242

[56] References Cited
FOREIGN PATENTS OR APPLICATIONS
935,611  8/1963  United Kingdom............ 260/397.45
929,429  6/1963  United Kingdom............ 260/397.45

Primary Examiner—Elbert L. Roberts
Attorney, Agent, or Firm—Hammond & Littell

[57] ABSTRACT

The invention relates to a process for the production of 16α-methyl-Δ$^{1,4,9(11)}$-pregnatrien-3,20-diones having the formula

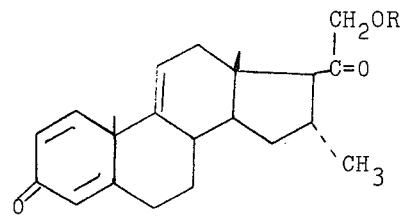

wherein R is hydrogen or the acyl of a carboxylic acid having 1 to 18 carbon atoms, pharmacological preparations containing said 16α-methyl-Δ$^{1,4,9(11)}$-pregnatrien-3,20-diones and methods of treating allergies using the above pharmacological preparation.

4 Claims, No Drawings

PROCESS FOR THE PREPARATION OF 16α-METHYL-Δ$^{1,4,9(11)}$-PREGNATRIEN-3,20-DIONES AND USE OF THE SAME IN TREATMENT OF ALLERGIES

THE PRIOR ART

The 16α-methyl-Δ$^{1,4,9(11)}$-pregnatrien-3,20-diones having the formula

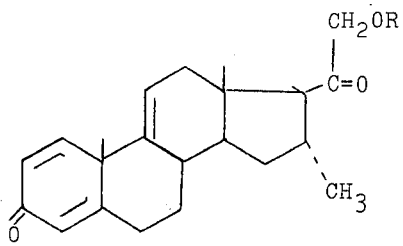

wherein R is hydrogen or acyl of a carboxylic acid having from 1 to 18 carbon atoms are known chemical products. However no pharmacological properties nor therapeutic application for the compounds have ever previously been described. They can be prepared according to the process indicated in French Pat. Nos. 1,296,544 and 1,461,655.

OBJECTS OF THE INVENTION

An object of the present invention is the development of a process for the treatment of allergic reactions in warmblooded animals which consists in administering a safe but effective amount of a 16α-methyl-Δ$^{1,4,9(11)}$-pregnatrien-3,20-dione having the formula

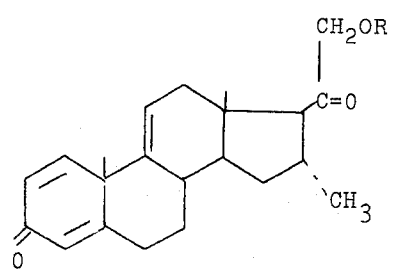

wherein R is a member selected from the group consisting of hydrogen and the acyl of an organic carboxylic acid having from 1 to 18 carbon atoms, to a warmblooded animal undergoing an allergic reaction.

A further object of the present invention is the development of pharmaceutical compositions for the treatment of allergic reactions comprising a minor amount of the above 16α-methyl-Δ$^{1,4,9(11)}$-pregnatrien-3,20-diones and a major amount of a pharmacological excipient.

A yet further object of the present invention is the development of a process for the production of a 16α-methyl-Δ$^{1,4,9(11)}$-pregnatrien-3,20-dione having the formula

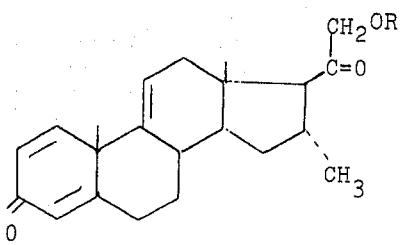

wherein R is a member selected from the group consisting of hydrogen and the acyl of an organic carboxylic acid having from 1 to 18 carbon atoms, which consists essentially of the steps of subjecting a compound having the formula

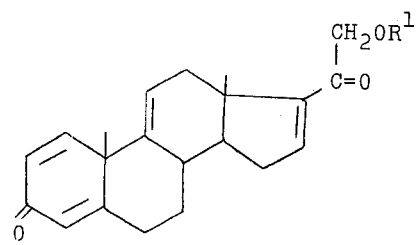

wherein R$^1$ is the acyl of an organic carboxylic acid having from 1 to 18 carbon atoms, to the action of a methyl magnesium halide in the presence of an inert anhydrous organic solvent, and recovering said 16α-methyl-Δ$^{1,4,9(11)}$-pregnatrien-3,20-dione.

These and other objects of the present invention will become more apparent as the description thereof proceeds.

DESCRIPTION OF THE INVENTION

It has now been discovered that the 16α-methyl-Δ$^{1,4,9(11)}$-pregnatrien-3,20-diones of the formula I

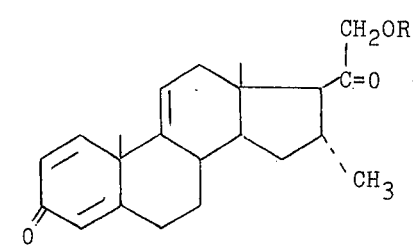

I wherein R is hydrogen or the acyl of an organic carboxylic acid having from 1 to 18 carbon atoms, have interesting physiological properties and are useful as medicaments.

When R represents an acyl radical, it is preferably the acyl of an alkanoic acid having from 1 to 12 carbon atoms such as formic acid, acetic acid, propionic acid, butyric acid, isobutyric acid, valeric acid, trimethylacetic acid, β-trimethyl-propionic acid or undecylic acid, or the acyl of a cycloalkanoic acid having 4 to 8 carbon atoms such as cyclopropylcarboxylic acid, cyclobutylcarboxylic acid, cyclohexylcarboxylic acid, etc, or also the acyl of an aromatic hydrocarbon carboxylic acid containing from 7 to 12 carbon atoms, such as benzoic acid or phenylacetic acid. In particular, the compound 16α-methyl-21-acetyloxy-Δ$^{1,4,9(11)}$-pregnatrien-3,20-dione, where R=acetyl, is preferred as a medicament.

The compounds of formula I present especially a very marked anti-allergic activity while having only a very poor anti-inflammatory activity. The compounds of formula I are about 1000 times less anti-inflammatory than dexamethasone and only about 50 times less anti-allergic. This disassociation of properties is of great interest, because it is possible to use the compounds of formula I at dosages where only its anti-allergic properties are manifested. The compounds of formula I are devoid of the classic secondary effects of the glucocorticoids and present an excellent therapeutic margin.

These properties enable the compounds of formula I to be utilized in human or animal therapy as a medicament. They can be utilized particularly in the treatment of seasonal or aperiodic rhinitis, or spasmodic coughing, or asthma, of skin disturcanes of diverse origins such as urticaria.

More particularly, the present invention relates to a process for the treatment of allergic reactions in warm-blooded animals which consists in administering a safe but effective amount of a 16α-methyl-Δ$^{1,4,9(11)}$-pregnatrien-3,20-dione having the formula

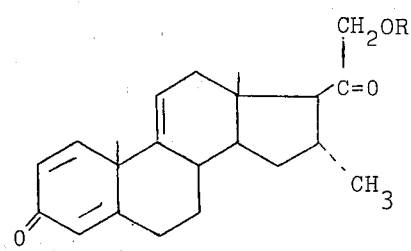

wherein R is a member selected from the group consisting of hydrogen and the acyl of an organic carboxylic acid having from 1 to 18 carbon atoms, to a warm-blooded animal undergoing an allergic reaction.

The invention equally relates to pharmaceutical compositions containing, as active principle, at least one compound of formula I. More particularly, these are pharmaceutical compositions for the treatment of allergic reactions in warm-blooded animals comprising a minor amount of a 16α-methyl-Δ$^{1,4,9(11)}$-pregnatrien-3,20-dione having the formula

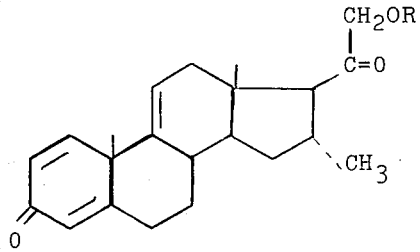

wherein R is a member selected from the group consisting of hydrogen and the acyl of an organic carboxylic acid having from 1 to 18 carbon atoms, and a major amount of a pharmaceutical excipient.

These compositions can be solid or liquid and are presented in the pharmaceutical forms currently used in human therapy for oral, parental or rectal administration. These are, for example, tablets or coated tablets, gelules, syrups or suspensions, injectable solutes or suspensions or suppositories. These pharmaceutical forms are prepared accordingly to the usual methods.

The compounds of formula I can be compounded with the usual excipients employed in pharmaceutical compositions such as talc, arabic gum, lactose, starch, water, organic solvents, etc. The useful dosology of the compounds of formula I is controlled for example between 10 mg and 200 mg per day orally, in the adult, or from 0.2 to 4 mg/kg per day in the warm-blooded animal.

The invention also relates to a process for the preparation of the compounds of formula I characterized in that a compound of formula II

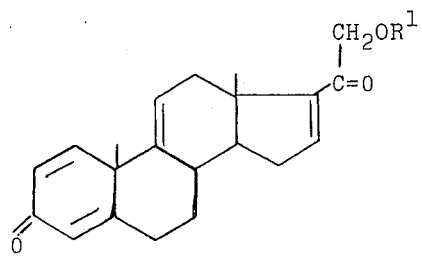

in which R$^1$ is an acyl of an organic carboxylic acid having from 1 to 18 carbon atoms, is subjected to the action of a methyl magnesium halide, the compound of formula I is obtained where R is hydrogen, and this compound, if desired is subjected to an esterification agent in order to obtain a compound of formula I wherein R is an acyl. More particularly, this process of the invention is a process for the production of a 16α-methyl-Δ$^{1,4,9(11)}$-pregnatrien-3,20-dione having the formula

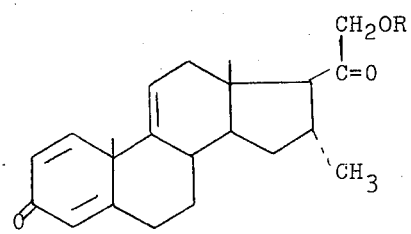

wherein R is a member selected from the group consisting of hydrogen and the acyl of an organic carboxylic acid having from 1 to 18 carbon atoms, which consists essentially of the steps of subjecting a compound having the formula

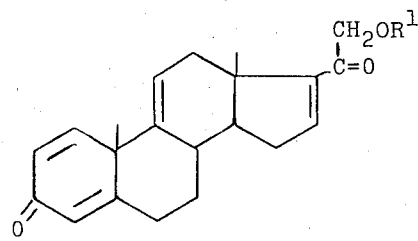

wherein R$^1$ is the acyl of an organic carboxylic acid having from 1 to 18 carbon atoms, to the action of a methyl magnesium halide in the presence of an inert anhydrous organic solvent, and recovering said 16α-methyl-Δ$^{1,4,9(11)}$-pregnatrien-3,20-dione.

The compounds utilized as starting materials of formula II can be prepared according to the method given in U.S. Pat. No. 2,864,834. The preferred value for both R and R¹ is acetyl.

In the preferred method of practicing the process of the invention:

a. The methyl magnesium halide utilized is methyl magnesium bromide or methyl magnesium chloride.

b. The reaction between a compound of formula II and the methyl magnesium halide is effected in the presence of an inert anhydrous organic solvent, preferably an ether, such as diethyl ether, dioxane or tetrahydrofuran, and in the presence of a catalyst such as, for example a copper salt, such as cuprous chloride.

c. The reaction is conducted at a temperature between −50°C and +20°C.

d. The esterification reaction, if employed, is effected by employing an acid or a functional derivative thereof, for example an acid chloride or acid anhydride, in the presence of a base, such as pyridine.

The invention also relates to a variant of the preceeding process characterized in that a compound of the formula II′.

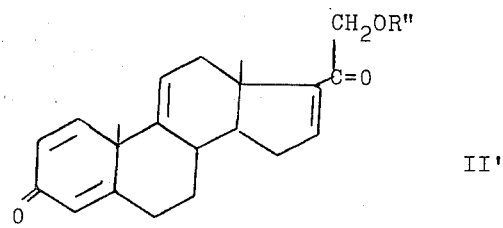

II′ in which R″ represents a hydroxyl blocked in the form of an ether, is subjected to the action of a methyl magnesium halide, the product obtained is subjected to the action of an acid in order to obtain the compound of formula I where R is hydrogen, which is then reacted, if desired, with an esterification agent in order to obtain a compound of formula I where R is an acyl.

The following examples are illustrative of the practice of the invention without being limitative in any manner.

EXAMPLE 1

16α-methyl-Δ$^{1,4,9(11)}$-pregnatrien-21-ol-3,20-dione 1100 cc of tetrahydrofuran, then 2 gm of cuprous chloride were introduced under agitation and under a stream of nitrogen into 285 cc of a solution of methyl magnesium bromide in tetrahydrofuran, having a titer of 2.39 mols per liter. The agitation was maintained for a period of fifteen minutes at about 20°C, then the temperature was lowered to −45°C. At this temperature of −45°C, over a period of thirty minutes, a solution containing 100 gm of 21-acetyloxy-Δ$^{1,4,9(11),16}$-pregnatetraen-3,20-dione (prepared according to the method indicated in U.S. Pat. No. 2,864,834) in 1000 cc of tetrahydrofuran, was then introduced. The suspension thus obtained was brought to a temperature of about −27°C and agitated for about four hours under these conditions. 200 cc of methanol were then added to the preceeding suspension at a temperature of −30°C. The suspension obtained was maintained under agitation for fifteen minutes at −30°C, then poured into 2 liters of water containing 600 gm of ammonium chloride.

The organic phase was decanted. The residue was extracted with tetrahydrofuran, washed with water and dried. 143 gm of raw 16α-methyl-Δ$^{1,4,9(11)}$-pregnatrien-21-ol-3,20-dione were thus obtained which was used as such in the next example.

EXAMPLE 2

21-acetyloxy-16α-methyl-Δ$^{1,4,9(11)}$-pregnatrien-3,20-dione 143 gm of the product prepared in Example 1 were introduced into 200 cc of pyridine. 100 cc of acetic acid anhydride were then introduced over five minutes into the reaction mixture, at room temperature, under agitation and a stream of nitrogen. The reaction mixture was then maintained under agitation for four hours. Next, the reaction mixture was poured over a period of thirty minutes into a mixture of water, ice and hydrochloric acid. The precipitate formed was vacuum filtered and washed. The product was dissolved in methylene chloride and washed with aqueous hydrochloric acid and with water.

132 gm of a product were obtained which was subject to chromatographic purification and recrystallization from ethyl acetate. 22.7 gm of 21-acetyloxy-16α-methyl-Δ$^{1,4,9(11)}$-pregnatrien-2,20-dione were thus obtained, melting at 167°C.

EXAMPLE 3

Example of a Pharmaceutical Form

Tablets were produced weighing 150 mg and containing 20 mg of the product of Example 2 (hereinafter called "Product A"), from the following recipe:

| Product A | 20 | mg |
|---|---|---|
| Lactose | 80 | mg |
| Wheat starch | 35 | mg |
| Polyvinylpyrrolidone | 6 | mg |
| Talc | 7.5 | mg |
| Magnesium stearate | 1.5 | mg |
| | 150 | mg |

EXAMPLE 4

Pharmacological Study of 16α-methyl-21-acetyloxy-Δ$^{1,4,9(11)}$-pregnatrien-3,20-dione (Product A)

Product A was studied comparatively to dexamethasone. The two compounds were utilized in suspension in an aqueous vehicle containing 0.25 percent of carboxymethylcellulose and 0.20 percent of "Polysorbate 80" (a polyoxyethylated sorbitol mono-oleate).

1. ACUTE TOXICITY

The product was administered orally in a volume of 0.4 ml of the above-defined suspension for 20 gm of body weight to homogenous lots of 10 female mice of the Swiss strain weighing from 19 to 21 gm. Under these conditions the product was not toxic at a dose of 800 mg/kg.

2. ANTI-INFLAMMATORY ACTIVITY

This was determined according to the classic granuloma technique. The technique used was modified from the Meier et al method (Experientia, 1950, 6, 469). some conventional female Wistar rats, weighing 100 to 110 gm, received an implantation of two pellets of cotton weighing 10 mg each, under the skin of the thorax. The oral treatment, which started immediately after this implantation, lasted two days, at a rate of two administrations per day. 16 hours after the last ingestion, i.e. on the third day, the animals were sacrificed.

The pellets surrounded by the tissue of granuloma formed, were weighed once in the fresh state, then after drying for 18 hours at 60°C. The weight of the granuloma was obtained after deduction of the initial weight of the cotton.

The weight of the thymus, separated at the same time as the granulomas, enabled a determination of the thymolytic activity of the tested compounds.

Referring to Table I wherein the results are set forth, it can be noted that Product A begins to manifest a weak anti-granulomatosic activity but no thymolytic effect at a dose of 20 mg/kg. At a dose of 50 mg/kg, the inhibition of granuloma and the involution of the thymus attained about a 35 percent level. Comparatively, the 50 percent active dose ($AD_{50}$) of dexamethasone is about 0.05 mg/kg on both the granuloma and the thymus.

The anti-inflammatory effect of Product A is thus more than 1000 times less than that of dexamethasone. Moreover, to the contrary of the effect of dexamethasone, Product A has very little effect on the body growth of animals even at the great dosages utilized here.

aphylactoid reaction, which can be determined by an edema particularly visible in the limbs and nose, as has been shown by Vorrhes et al, (Proc. Soc. Exp. Biol. 76, 254 (1951)). This response is due to the liberation of biogenic amines, especially serotonine, by the mastocytes.

The tests were conducted on groups of eight male rats of the Sprague Dawley SPF strain, weighing from 110 to 130 gm. Dextran was administered at a dose of 150 mg/kg in a volume of 1 ml per 100 gm and the degree of edema was evaluated one hour afterwards. That of the nose and fore paws was evaluated according to an arbitrary scale going from 0 to 3 and that of the hind paws by measurement of their volume with a mercury plethysmometer, of which 12 units correspond about to 1cc.

The results of several tests are given in Table II. It can be noted therefrom, that when the compounds were administered orally one hour before the dextran injection, their effect was especially visible on the edema of the hind paws. 50 mg/kg of Product A showed thus to be sensibly more active than 0.5 mg/kg of dexamethasone.

If the treatment was practiced two hours before the injection of dextran, the same dose (50 mg/kg) of Product A reduces, at that time, all the edemas in amounts

TABLE I

TEST OF GRANULOMA

| | Unitary Dose mg/kg P.O. | Number of rats | Growth in % | Dry granuloma mg | Dry granuloma % inhibition | Thymus mg | Thymus involution in % |
|---|---|---|---|---|---|---|---|
| Controls | 0 | 48 | 7 | 48,3 ± 1,6[1] | | 274 ± 9 | |
| Product A | 10 | 24 | 5 | 49,5 ± 2,7 | 0 | 248 ± 10 | 10 |
| Product A | 20 | 24 | 5 | 34,6 ± 2,6** | 28 | 253 ± 9 | 8 |
| Product A | 50 | 31 | 4 | 31,0 ± 2,1** | 36 | 181 ± 8** | 34 |
| Controls | 0 | 50 | 6 | 47,0 ± 1,7 | | 311 ± 9 | |
| Dexamethasone | 0,01 | 16 | 2 | 36,7 ± 1,9** | 22 | 227 ± 6** | 27 |
| Dexamethasone | 0,02 | 22 | −2 | 29,8 ± 2,3** | 37 | 212 ± 7** | 32 |
| Dexamethasone | 0,10 | 23 | −7 | 19,9 ± 1,6** | 58 | 97 ∓ 6** | 69 |
| Dexamethasone | 0,50 | 24 | −7 | 12,6 ± 1,1** | 73 | 73 ± 5** | 77 |

**$p<0.01$ according to the Dunnet test
[1]standard error
P.O. orally

3. ANTI-ALLERGIC ACTIVITY

This activity was determined according to the test of dextran provoked edema in rats. An intraperitoneal injection of dextran provokes in the rat a generalized anaphylactoid reaction, which can be determined by an quite close to those observed with 1 mg/kg of dexamethasone.

On this generalized anaphylactoid reaction, Product A was shown to be thus approximately 50 times less active than dexamethasone.

TABLE II

DEXTRAN PROVOKED EDEMA

| | Dose in mg/kg P.O | Number of rats | Edema of the hind paws Average volume before dextran in units | Edema of the hind paws Increase of volume 1 hour after dextran in units | Edema of the fore paws and nose, noted from 0 to 3 |
|---|---|---|---|---|---|
| Treatment 1 hour before dextran | | | | | |
| Controls | 0 | 8 | 26,9 | 13,4 | 1,3 |
| Product A | 50 | 8 | 26,9 | 6,6* | 1,3 |
| Dexamethasone | 0,5 | 8 | 26,6 | 9,4 | 1,2 |
| Treatment 2 hours before dextran | | | | | |
| Controls | 0 | 8 | 28,8 | 15,8 | 2,4 |
| Product A | 50 | 8 | 28,5 | 6,8** | 1,0* |
| Dexamethasone | 1 | 8 | 27,9 | 1,4** | 0,2** |
| Controls | 0 | 8 | 27,5 | 9,8 | 2,1 |
| Product A | 25 | 8 | 27,9 | 7,4 | 1,5 |
| Product A | 50 | 8 | 27,9 | 1,3** | 0,8* |

*$0.05 > p > 0.01$ according to the Dunnet test
**$p < 0.01$ according to the Dennet test The results of this pharmacological study clearly show the very low toxicity of Product A. Its anti-inflammatory activity is at least 1000 times less than that of dexamethasone whereas its anti-allergic activity is only 50 times weaker than that of dexamethasone.

The other product of Formula I have comparable pharmacological properties.

The preceeding specific embodiments are illustrative of the practice of the invention. It is to be understood however that other expedients known to those skilled in the art or disclosed herein may be employed without departing from the spirit of the invention or the scope of the appended claims.

We claim:

1. Pharmaceutical compositions for the treatment of allergic reactions of seasonal or aperiodic rhinitis, spasmodic coughing, asthma and skin disturbances in warm-blooded animals comprising a minor amount of 16α-methyl-$\Delta^{1,4,9(11)}$-pregnatrien-3,20-dione having the formula

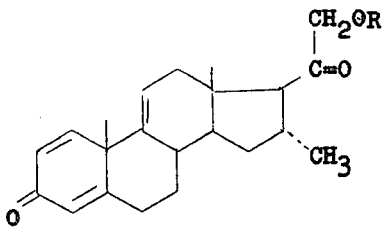

wherein R is a member selected from the group consisting of hydrogen and the acyl of an organic carboxylic acid having from 1 to 18 carbon atoms, and a major amount of a pharmaceutical excipient.

2. The composition of claim 1 wherein R is acetyl.

3. A process for the treatment of allergic reactions of seasonal or aperiodic rhinitis, spasmodic coughing, asthma and skin disturbances in warm-blooded animals which consists in administering from 0.2 to 4 mg/kg of body weight per day of a 16α-methyl-$\Delta^{1,4,9(11)}$-pregnatrien-3,20-dione having the formula

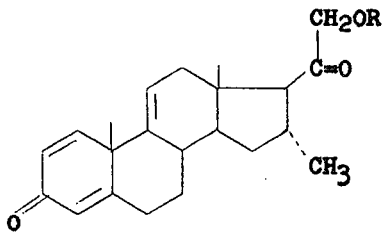

wherein R is a member selected from the group consisting of hydrogen and the acyl of an organic carboxylic acid having from 1 to 18 carbon atoms, to a warm-blooded animal undergoing said allergic reaction.

4. The process of claim 3 wherein R is acetyl.

* * * * *